UNITED STATES PATENT OFFICE.

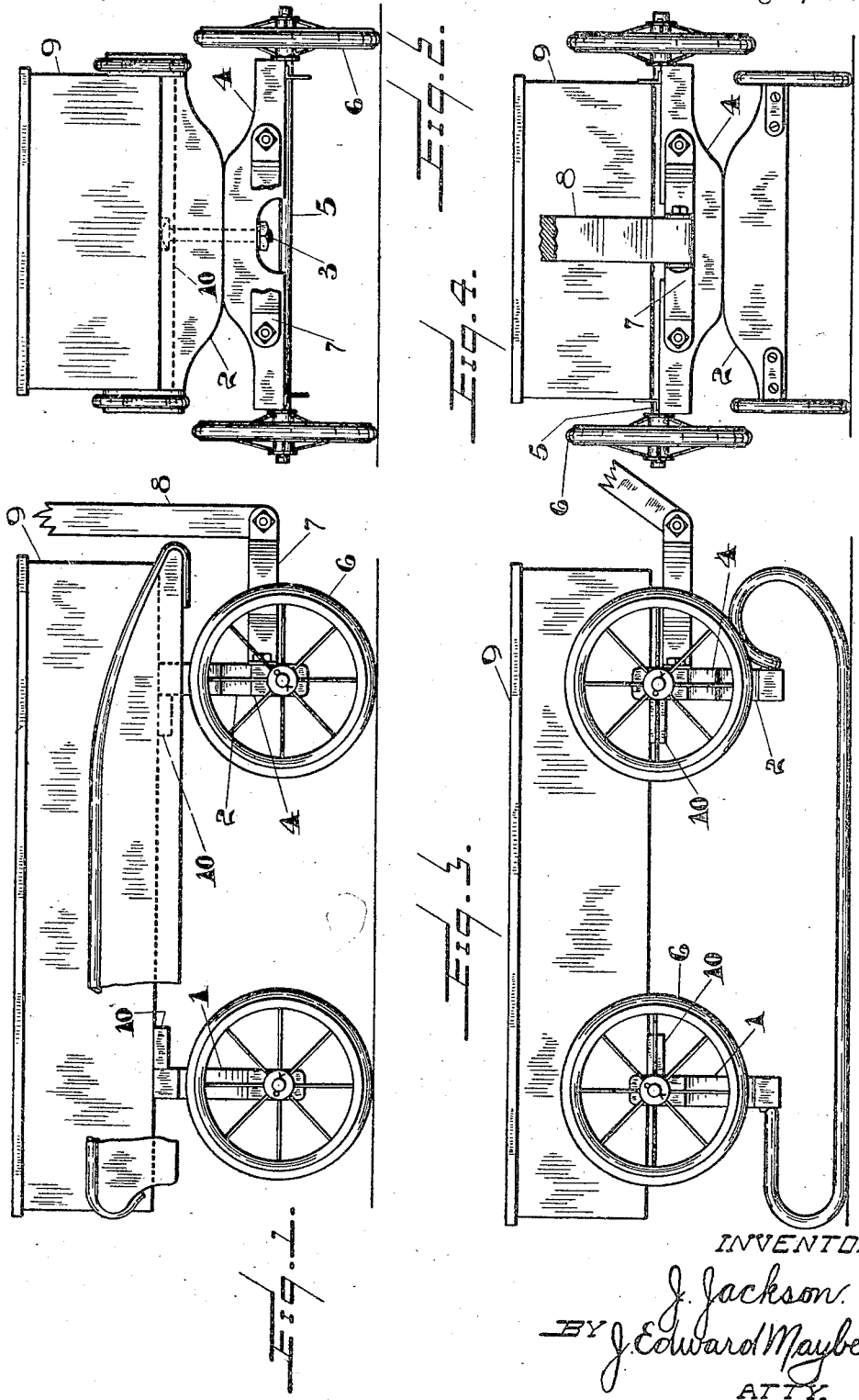

JAMES JACKSON, OF LONDON, ONTARIO, CANADA.

CHILD'S VEHICLE.

1,312,444.  Specification of Letters Patent.  Patented Aug. 5, 1919.

Application filed January 29, 1919. Serial No. 273,803.

*To all whom it may concern:*

Be it known that I, JAMES JACKSON, of the city of London, in the county of Middlesex, Province of Ontario, Canada, a subject of the King of Great Britain, have invented certain new and useful Improvements in Children's Vehicles, of which the following is a specification.

My object in the present invention is to devise a combination sleigh and wagon adapted for use, according to its design and finish, either as a children's toy or as a baby carriage.

I attain my object by means of the constructions hereinafter described and illustrated in the accompanying drawings in which—

Figure 1 is a side elevation, partly broken away, of a vehicle constructed in accordance with my invention and showing the wheels in use;

Fig. 2 is an end elevation of the same;

Fig. 3 is a side elevation showing the runners in use, the runners being a modification of the form shown in Fig. 1; and Fig. 4 is an end elevation of Fig. 3.

In the drawings like numerals of reference indicate corresponding parts in the different figures.

1 is a rear bolster and 2 a front bolster. Pivotally connected with the front bolster by means of a king bolt 3 is a wooden axle 4. To the lower edge of the rear bolster and the lower edge of the wooden axle (having reference to Figs. 1 and 2) is secured a metal axle 5. On these axles are journaled the wheels 6. It is preferable that the depth of the rear bolster be equal to the combined depth of the front bolster and the wooden axle 4.

To the wooden axle are secured the hounds 7 to which the tongue 8 is pivotally connected in the usual manner. 9 is a wagon box, to the bottom of which are secured the cross bars or cleats 10. These cross bars are adapted to fit against the bolsters as shown in Fig. 1 or against the rear bolster and the wooden axle as shown in Fig. 3. Preferably the cross bars fit between the parts as shown.

From the above description it will be seen that if the vehicle is to be used as a sleigh, the bolsters with the connected parts are turned so that the runners are downward and the wagon box is then fitted in place as shown in Figs. 3 and 4. If the device is to be used as a wagon, the bolsters with their connected parts are reversed so that the wheels contact with the ground and the wagon box is fitted in place as shown in Figs. 1 and 2.

When the device is used as a sleigh the front cross bar on the box prevents turning of the front axles, so that the vehicle acts in every way as an ordinary sleigh.

What I claim as my invention is:

1. In a vehicle, the combination of a pair of bolsters; a rear axle carrying wheels and fixedly connected to the rear bolster; a front axle carrying wheels and connected by a king bolt with the front bolster; a wagon box provided on the underside of its bottom with two cross bars adapted to fit against the two bolsters or against the rear bolster and the front axle; and runners secured to the bolsters and facing in the direction away from the wheel axles.

2. In a vehicle, the combination of a pair of wooden bolsters; a wooden axle pivotally connected by a king bolt to the front bolster, the rear bolster being of substantially the same depth as the front bolster and wooden axle; metal axles carrying wheels and fixedly connected to the rear bolster and wooden front axles respectively; a wagon box provided on the underside of its bottom with two cross bars adapted to fit against the two bolsters or against the rear bolster and the front wooden axle, and runners secured to the bolsters and facing in the direction away from the wheel axles.

Signed at the city of London, Ontario, Canada, this 23rd day of January, 1919.

JAMES JACKSON.

Copies of this patent may be obtained for five cents each, by addressing the "Commissioner of Patents, Washington, D. C."